United States Patent [19]

Karpowycz et al.

[11] 4,245,352
[45] Jan. 13, 1981

[54] AUTOMATED SYSTEM FOR TESTING RADIO RECEIVERS

[75] Inventors: Oleh Karpowycz, West Chicago; Narendra C. Thakkar, Roselle, both of Ill.

[73] Assignee: International Jensen Incorporated, Westchester, Ill.

[21] Appl. No.: 18,445

[22] Filed: Mar. 7, 1979

[51] Int. Cl.³ ............................................. H04B 17/00
[52] U.S. Cl. ................................... 455/226; 179/1 G; 324/73 R
[58] Field of Search ............ 324/73 AT, 77 E, 140 R, 324/73 R; 364/579, 580; 340/146.1 E; 179/1 G, 1 GB, 175; 325/67.363; 455/67.226

[56] References Cited

U.S. PATENT DOCUMENTS

| | | | |
|---|---|---|---|
| 3,522,532 | 8/1970 | McCoy | 324/73 R |
| 3,602,819 | 8/1971 | Abbott et al. | 325/363 |
| 3,739,349 | 6/1973 | Burdette et al. | 324/73 R |
| 3,764,995 | 10/1973 | Helf, Jr. et al. | 324/73 R |
| 3,895,191 | 7/1975 | Koganezawa et al. | 179/1 G |
| 3,922,537 | 11/1975 | Jackson | 324/73 R |
| 4,055,801 | 10/1977 | Pike et al. | 324/73 T |

OTHER PUBLICATIONS

Instruction Manual on "FM/AM Modulation Meter TF 2300" By Marconi Instruments Limited, 1966.
"IEEE Standard Methods of Testing Amplitude-Modulation Broadcast Receivers", IEEE Standard STD 186–194 g, Reaffirmed 1972.
IEEE Standard Method of Testing Receivers Employing Ferrite Core Loop Ant.", IEEE STD. 189–195s, Reaffirmed 1972.
IEEE Standard Methods of Testing Freq: Modulation Broadcast Receiver", IEEE STD 185-1975.

*Primary Examiner*—Jin F. Ng
*Attorney, Agent, or Firm*—Darbo & Vandenburgh

[57] ABSTRACT

An automated system for electronically testing the response and the quality of the output produced by radio receivers and the like is provided, wherein various tests including frequency response, harmonic distortion, sensitivity, selectivity, signal-to-noise ratio, fidelity, stereophonic separation and the like may be effectively and efficiently performed for testing a plurality of broadcast bands and signals without the aid of skilled technicians or trained personnel.

25 Claims, 7 Drawing Figures

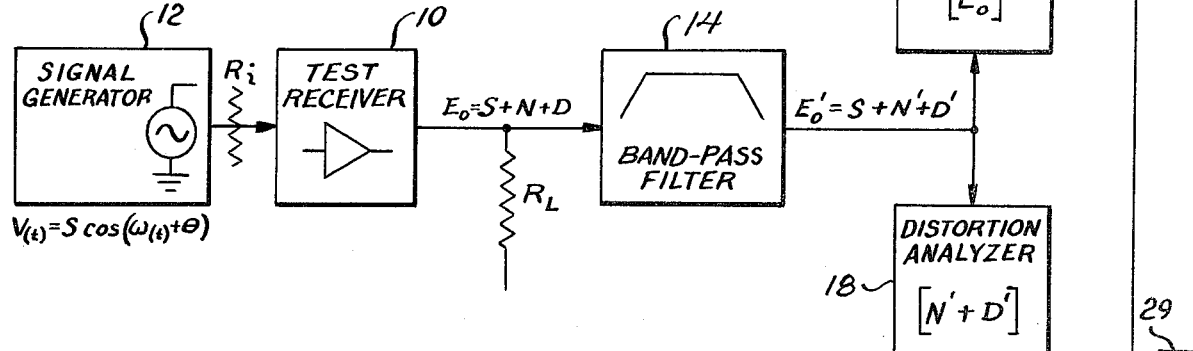
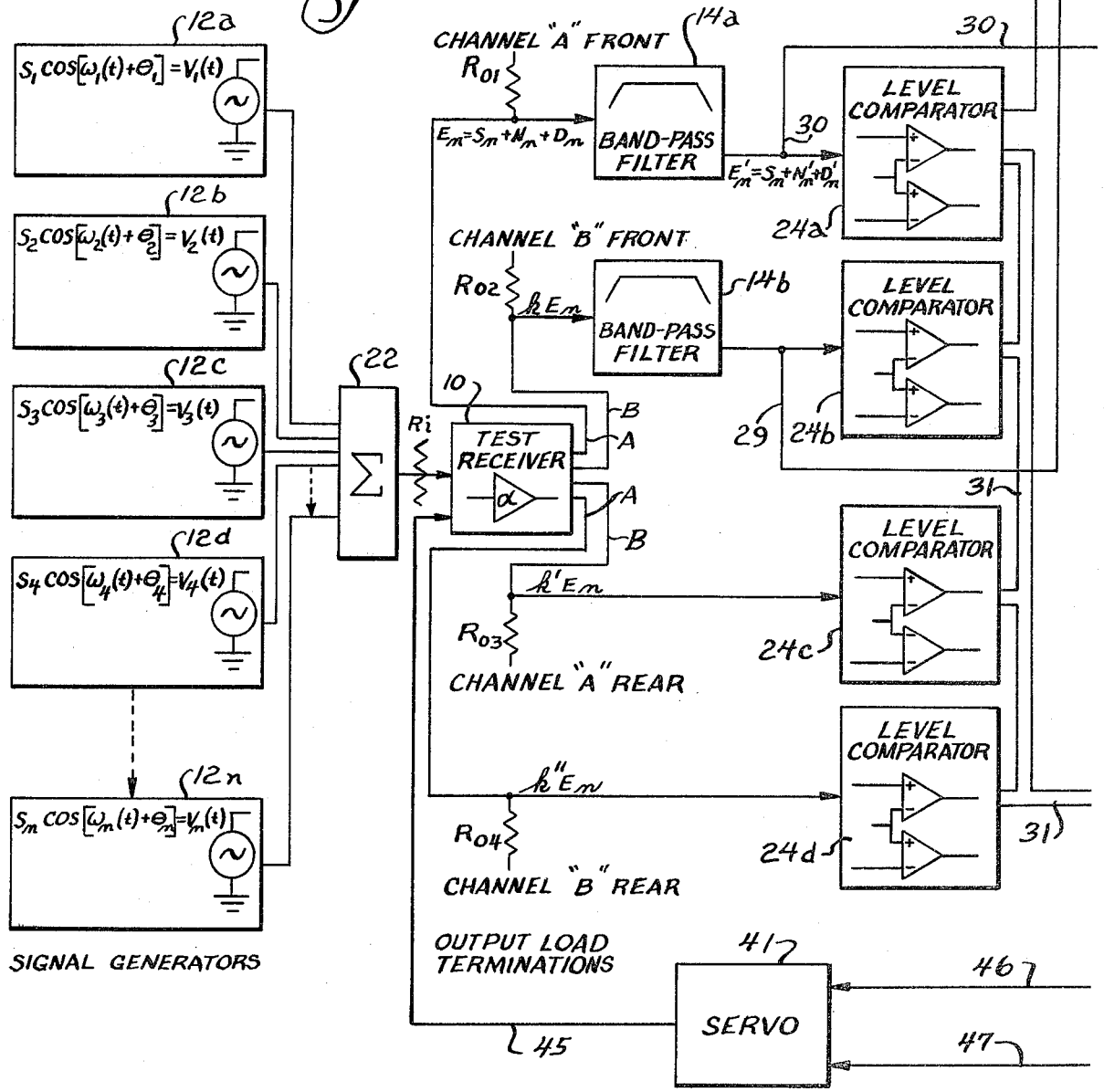

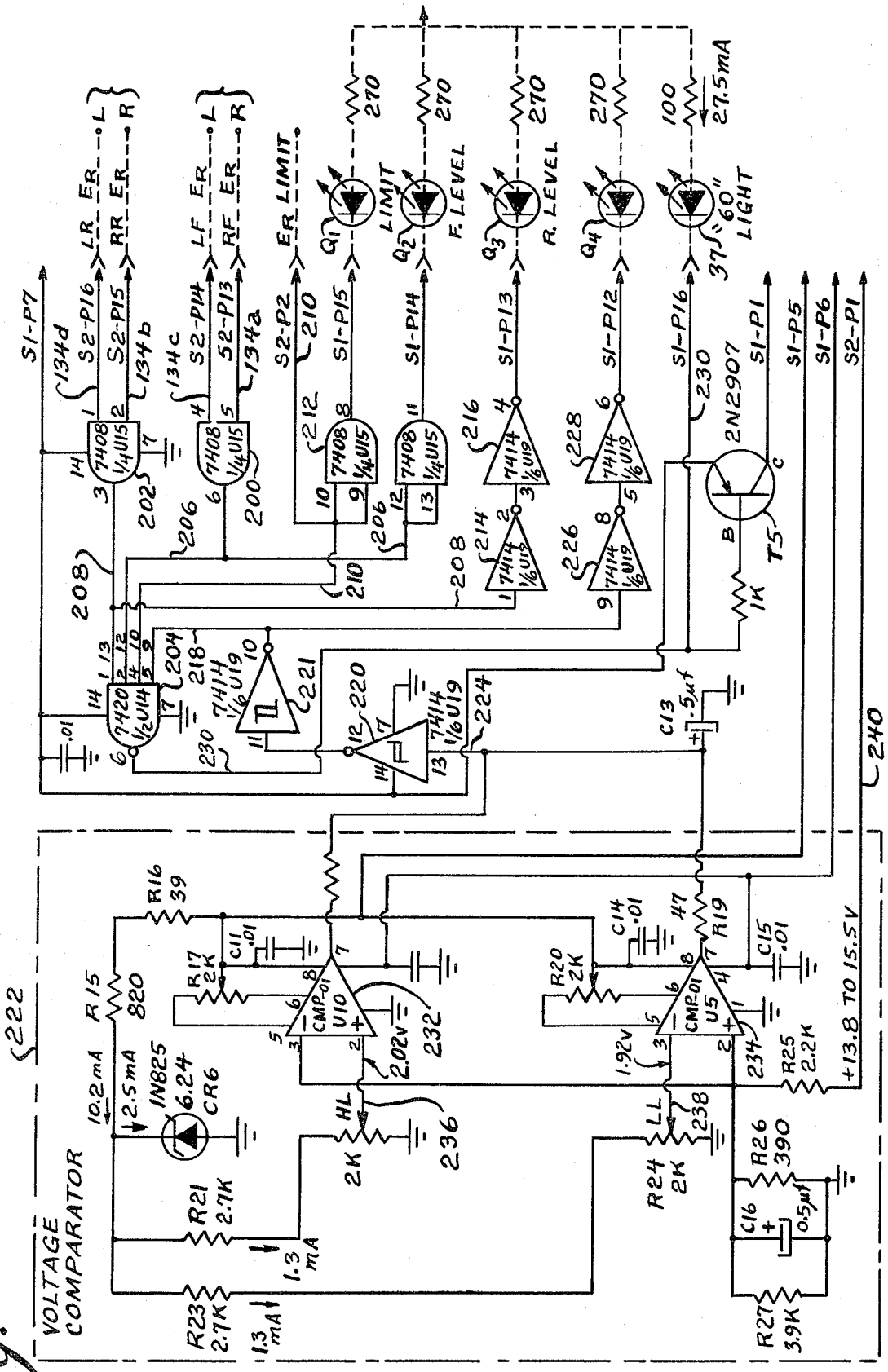

AUTOMATED SYSTEM FOR TESTING RADIO RECEIVERS

BACKGROUND OF THE INVENTION

Present day radio receivers and the like vary so greatly in their manner of operation that it is difficult to set down a single test procedure for each fundamental characteristic and have the procedure include all of the allowances that should be made for the peculiarity of the many different receivers. Over the years, skilled technicians and trained personnel have developed myriad testing procedures for determining the output quality and response of such units, wherein elaborate and complicated testing techniques have evolved for measuring frequency response, distortion, sensitivity, selectivity, signal-to-noise ratio, fidelity, stereophonic separation, and the like to determine the quality of the response of the unit to a given input signal.

Examples of the equipment required and the procedure involved in making tests of the above nature are set forth in *I.E.E.E. Standard Methods of Testing Amplitude-Modulation Broadcast Receivers,* I.E.E.E. Standard STD186-1948 (reaffirmed 1972); *I.E.E.E. Standard Method of Testing Receivers Employing Ferrite or Loop Antennas,* I.E.E.E. Standard STD189-1955 (reaffirmed 1972); and *Standard Methods of Testing Frequency-Modulation Broadcast Receivers,* I.E.E.E. Standard STD185-175, all published by the Institute of Electrical and Electronics Engineers, Inc., 345 East 47th Street, New York, New York 10017. As set forth in these publications, skilled technicians or highly trained personnel manually perform each of the various tests by connecting the receiver to specialized equipment and monitoring the results for determining whether the receiver being tested falls within acceptable parameters.

It has been found that the testing of numerous key parameters of a unit having an AM/PM radio receiver with an integral tape player for the full range of tests required to properly determine the high fidelity output response of the unit takes as much as forty minutes of a skilled technician's time using these known methods. For this reason, assembly line receiver/playback units are generally spot-checked with as many as ninety to ninety-five percent of the sets being untested before they are placed in the marketplace. This lack of quality control could result in a very high percentage of defective units being placed in the field. With the increasing interest in and demand for this type of unit, particularly in the automotive after-market, it has become increasingly desirable to provide a better means of effective and economical quality control.

For example, it is known to use a specially programmed computer to perform many of the tests set forth in the I.E.E.E. Standards. Such a system is presently available from Motorola Inc., Chicago, Illinois. However, this system is not only costly to use but also has proven to be complicated in practice, requiring the use of skilled technicians. In addition this system has a relatively high initial cost because of the nature of the equipment involved.

SUMMARY OF THE INVENTION

The present invention provides an automated method and apparatus for testing receivers and the like for full audio bandwidth response, with complete quality checking, wherein the quality of the output is accurately tested within specific limits, without requiring the use of either skilled technicans or highly trained personnel. The testing for a typical unit having an AM/FM radio receiver with integral tape player is reduced from as much as forty minutes under known methods to within two to three minutes. The testing procedure may be fully automated, requiring no personnel at the testing station, or may be semi-automated, wherein an unskilled operator is needed only for tuning the receiver and for setting the volume control during the testing operation.

A source signal generator generates one or more "pure" test signals for providing a test input to the receiver/playback unit, the output of which is then coupled across a dummy load which simulates the resistance load of a typical speaker arrangement. The output signal generated by the receiver/playback unit may be passed through a band-pass filter which separates out any unused portions of the signal, for example, signals which are not discernible by the human ear, i.e., signals of below 30 Hz. and above 18,000 Hz. The remaining output signal comprises the pure signal which was introduced into the receiver plus any audible noise and distortion generated by the receiver being tested. The output signal thus generated is then electronically tested to determine if the noise level and the distortion level of the signal is within specific limits. The output is also tested for quality, fidelity, separation and sensitivity without the requirement of a skilled technician. Of course, myriad other tests may be performed using the teachings of the invention. For example, the methods of the present invention are readily adaptable for testing the response of citizen band radio receivers, amateur radio equipment, shortwave receivers and the like.

The test outputs are combined and communicated to a diagnosis logic center which electronically determines whether the receiver response is within the specified parameters for each test performed. The diagnosis logic center then generates a "pass" signal, which indicates the receiver is acceptable, or a "fail" signal, which also indicates the particular test that has not produced acceptable results, thereby assisting in trouble-shooting.

The method is based upon a sequencing network which involves decoding the input signals and activating a specific test for each of the plurality of the input signals, wherein one of the various tests is performed in response to a specific one of the input signals. Since all of the input signals are simultaneously generated and introduced into the receiver, decoding is necessary in order to perform the proper test when the receiver is tuned to a specific signal. Of course, tuning may be done manually or automatically as long as the decoder responds to and activates a specific test for each particular tuned signal.

In the semi-automated system, an unskilled operator tunes the test receiver to the desired signal in the same manner as he would tune a home or car radio to a desired station. The decoder then responds to this signal and performs the proper test.

In the fully automated system, a servomechanism is coupled to the tuner of the receiver and to the decoding logic. The decoder then selects a particular input signal, tunes the receiver to the signal and activates the test for the signal. After the test is performed, the signal decoder selects another signal, tunes the receiver and activates the proper test until the entire testing process is completed, the complete procedure being performed without human assistance.

BRIEF DESCRIPTION OF THE DRAWING

FIG. 1 is a general block diagram of a testing procedure according to the present invention.

FIGS. 2a and 2b comprise a detailed block diagram illustrating a testing procedure for testing the quality and fidelity of the output produced by a typical multiband, two channel AM/FM radio receiver-tape playback unit, in accordance with the teachings of the present invention.

FIGS. 3a, 3b, 3c and 3d are detailed schematic diagrams of a sequencing network, a signal decoding network, a level logic circuit and a diagnosis logic center according to the present invention.

DESCRIPTION OF THE PREFERRED EMBODIMENTS

Figure 2B:
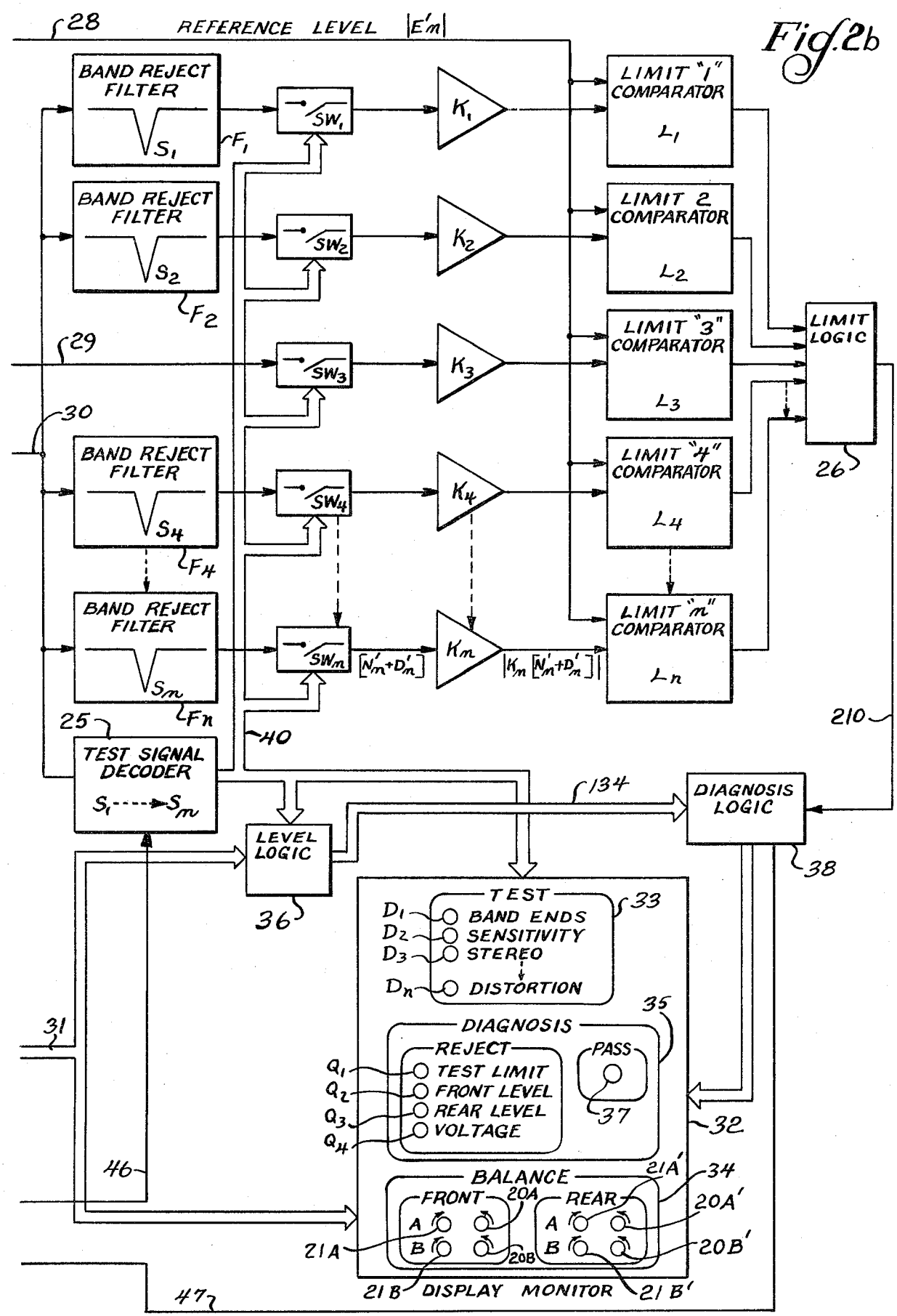

With specific reference to FIG. 1, it will be seen that four basically fundamental steps make up any one of the tests performed in order to determine the acceptability of the test receiver diagrammatically illustrated at 10 with some modifications for certain tests. In fact, with the automated system of the present invention, only three of the four steps are essential, the fourth being a matter of choice.

Initially, a source signal is provided by a signal generator 12. Of course, when a tape playback unit is tested, a pre-recorded test tape is utilized to provide the source signal. The generator 12 may be any suitable signal source which produces a simulated "pure" corresponding to a transmitted signal from a commercial source such as, by way of example, an amplitude-modulated (AM) broadcast signal of between 540 and 1700 KiloHertz per second (KHz). This carrier signal, say 560 KHz., will carry an audio signal of a specific frequency such as, by way of example, 500 Hz. Thus, if the test receiver 10 were tuned to 560 KHz. on the AM band, a perfect output would be an audio signal of 500 Hz. Essentially, this is expressed mathematically as follows:

(1) The generator 12 produces an output:

$$V_t = S\cos(w_t + 0),$$

where S equals the audio portion of the signal carried by the carrier signal $\cos(w_t + 0)$.

(2) The output $E_o$ of receiver 10 tuned to the carrier signal $\cos(w_t + 0)$ is, ideally, S. However, since the output of the receiver is not "ideal" but comprises the signal S plus impurities expressed as noise N and distortion D, the actual output is:

$$E_o = S + N + D,$$

when the receiver is tuned to the carrier signal.

It is the purpose of the test to determine what portion of the output signal $E_o$ is noise N and distortion D and whether the amount of noise and distortion is within acceptable limits. It is also essential to determine whether the output $E_o$ is of acceptable decibel levels when compared to the power level of the input signal S.

The output signal $E_o$ is measured across the dummy resistance load $R_L$ which simulates the load provided by a typical speaker system. Since in the preferred embodiment only that portion of the output which is discernible to the human ear is of significance, it is desirable, although entirely optional, to filter out the unused portions of the output $E_o$ by passing the signal through a typical band-pass filter 14. The band-pass filter is of well-known design and operates in known manner to filter out or eliminate any portion of the signal $E_o$ which falls outside a predetermined range such as, by way of example, 200 to 15,000 Hz. which conforms to I.E.E.E. specifications. Since the input signal S is within this range, our example being 500 Hz., only the unrelated low and high frequency portion of the noise N and distortion D is eliminated. In effect, this reduces the overall noise and distortion characteristics.

The resultant signal is:

$$E'_o = S + N' + D',$$

where S is the audio portion of the input signal $V_t$, $N'$ is the audio portion of the noise component and $D'$ is the audio portion of the distortion component.

The entire signal $E'_o$ is introduced into an audio voltmeter 16 where the output level is compared with the input level of the signal S to determine whether the amplitude of the receiver output signal, when compared to a given input signal, is within acceptable limits. The noise plus distortion portion of $E'_o$, i.e., $(N'+D')$, is introduced into a distortion analyzer 18 to determine whether the inefficiencies and inaccuracies of the receiver 10 are within acceptable parameters. For example, the signal-to-noise ratio $(E'_o:N')$ of the receiver 10 may be acceptable as long as it is greater than 63 dB. Thus a signal-to-noise ratio of less than 63 dB would be unacceptable and the receiver would not pass this particular test.

The diagram of FIG. 1 is exemplary of all of the tests performed according to the present invention. The signal generator 12, the band-pass filter 14 (when used) and the testing components 16 and 18 are of known design and their functions are explained in detail in the aforementioned I.E.E.E. specifications. The control of the test being performed and the sequencing procedures are disclosed by the more detailed diagram of FIGS. 2a and 2b, wherein the essence of the invention comprises the test signal decoder 25 and the switching circuitry $SW_1$-$SW_n$ disclosed in detail in FIGS. 3a and 3b, the level logic circuit 36 disclosed in FIG. 3c and the diagnosis logic circuit 38 disclosed in FIG. 3d.

As shown in FIGS. 2a and 2b, a typical test set-up includes a plurality of signal generators 12a–12n, all of which simultaneously produce outputs which are combined at a summing circuit 22. Ths summing circuit 22 is of known design and operates in typical manner to combine all of the generated signals and produce at input resistor $R_i$ a composite input signal comprising all of the signals generated by the various generators 12a–12n. This best simulates the actual working environment for the test receiver 10, wherein the various generators 12a–12n correspond to a plurality of broadcasting stations each producing a particular signal and sending it out over the airwaves so that a typical receiver is simultaneously subjected to all of these signals but is able to select and amplify a discrete signal by mean of band selection and tuning.

The test set-up of FIGS. 2a and 2b is for a receiver 10 having two channels A and B for stereophonic separation wherein each channel has front and rear speakers, respectively, as simulated by the output load termination resistors $R_{01}$ (Channel "A", front), $R_{02}$ (Channel "B", front), $R_{03}$ (Channel "A", rear) and $R_{04}$ (Channel "B", rear).

In operation, the receiver 10 is tuned to one of the plurality of signals presented to it by summing circuit 22. The tuning may be done manually or automatically, as will be explained. Depending on the signal "tuned" or selected, the receiver output may be stereophonic with distinct signal components on the separate channels A and B or may be monophonic with the entire output signal being produced on both channels A and B. During certain tests such as, by way of example, stereophonic separation, the input signal may be the A channel only with, ideally, the B channel void of output. Any variety of signals may be produced by generators $12a$–$12n$ for performing the various tests significant for the evaluation of the receiver 10.

Since only two distinct channels A and B are produced, the noise N and distortion D levels are measured only at the "Front" load resistors $R_{01}$ and $R_{02}$ and, therefore, only two band-pass filters $14a$ and $14b$ are required. Each of the level comparators $24a$, $24b$, $24c$ and $24d$ serves the function of the audio voltmeter 16 of FIG. 1. The band-reject filters $S_1$–$S_n$, combined with the respective amplifiers $K_1$–$K_n$ and the limit comparators $L_1$–$L_n$, serve the function of the distortion analyzer 18 of FIG. 1. It will be noted that FIGS. $2a$ and $2b$ comprise a single flow chart with signal lines 28, 29, 30, 31, 46 and 47 of FIG. $2a$ being coupled to signal lines 28, 29, 30, 31, 46 and 47 of FIG. $2b$, respectively.

Assuming that the receiver is tuned to a stereophonic signal having balanced, although different, A and B components, the testing procedure would involve all four branches of the circuitry of FIGS. $2a$ and $2b$, comprising the four load resistors $R_{01}$–$R_{04}$, the band pass filters $14a$ and $14b$ and the level comparators $24a$–$24d$. With the test receiver 10 tuned to the stereophonic signal having the balanced A and B components, the output of the test receiver is subdivided into its A and B signals with the A signal being produced across the A channel front resistor $R_{01}$ and the A channel rear resistor $R_{03}$ and with the B signal being produced across the B channel front resistor $R_{02}$ and the B channel rear resistor $R_{04}$, respectively.

Since the output of the test receiver 10 is subdivided into an A component and a B component, it is necessary to filter out the unrelated portions of the noise N and distortion D portions of each component. However, since the A component is duplicated at resistor $R_{01}$ and resistor $R_{03}$, only one band-pass filter need be inserted at resistor $R_{01}$. Likewise, the B component is duplicated at resistors $R_{02}$ and $R_{04}$, and a single band-pass filter is utilized at resistor $R_{02}$. All four speakers are tested for level of output thereacross relative to the level of the input signal introduced into the test receiver at $R_i$. Each of the outputs generated at resistors $R_{01}$–$R_{04}$ is introduced into the respective level comparators $24a$–$24d$. This signal is compared with a preset reference signal corresponding to the level of the input signal introduced at $R_i$ to determine whether the output of each branch of each channel A and B is within specified limits and to assure balance among the four speakers driven by receiver 10.

The output of each comparator indicates whether the particular load resistor $R_{01}$–$R_{04}$ is receiving an acceptable signal. An output signal which is too high relative to the input signal, or an output signal which is too low relative to the input signal, as determined by the reference signals, indicates a malfunction. The respective outputs of the level comparators are introduced via line 31 into a display monitor 32 which, in the preferred embodiment, includes a system balance panel 34 having a pair of display lights 20A, 21A; 20A', 21A'; 20B, 21B; 20B', 21B' for each load resistor $R_{01}$ (corresponding to the A channel front), $R_{03}$ (corresponding to the A channel rear), $R_{02}$ (corresponding to the B channel front), and $R_{04}$ (corresponding to the B channel rear), respectively. If all of the signals produced on line 31 by the level comparators are within acceptable parameters, none of the display lights will be illuminated. If one or more of the signals on line 31 is too high relative to the input signal, the corresponding display light 20A, 20A', 20B or 20B' will be illuminated. Conversely, if one or more of the signals on line 31 is too low relative to the input signal, the corresponding light 21A, 21A', 21B or 21B' will be illuminated. In the preferred embodiment, the level comparators $24a$–$24d$ serve the function of the audio voltmeter 16 illustrated in FIG. 1. The particular configuration of the level logic comparators $24a$–$24d$ is a matter of design choice, and the level comparators operate in the well-known manner. Each of the outputs of the level comparators is also introduced into the level logic circuit 36 to control the test diagnosis center 38, as will be explained in detail.

The test set-up shown in FIGS. $2a$ and $2b$ is designed so that a signal is always present on load resistor $R_{01}$ when the test receiver 10 is properly tuned to one of the input signals introduced at resistor $R_i$, i.e., a signal is always present on the A channel. The output $E'_n$ of the band-pass filter $14a$ is introduced to the decoder 25 via line 30 for selecting and activating the proper test for the particular signal $S_n$ to which the receiver 10 is tuned by closing one of the switches $SW_1$–$SW_n$. The complete output signal $E'_n$ of level comparator $24a$ is also communicated to each of the various testing networks via line 28 to provide a reference level input signal to the various comparator networks $L_1$–$L_n$, with the exception of the testing network comprising switch $SW_3$, amplifier $K_3$ and comparator $L_3$. This particular test network is used for checking stereophonic separation between the A and B channels and, as will be explained, uses the B channel signal.

The output signal $E'_n$ comprises the input signal $S_n$ plus the audio portion of noise $N'_n$ and the audio portion of distortion $D'_n$. This signal is introduced into a plurality of band-reject filter networks $F_1$–$F_n$ via line 30. The band reject filters $F_1$–$F_n$ are also in corresponding communication with the amplifiers $K_1$–$K_n$ and the limit comparators $L_1$–$L_n$.

Each corresponding combination of band reject filter, amplifier and limit comparator defines a particular testing network serving the function of the distortion analyzer 18 illustrated in FIG. 1 for checking the receiver against a specific set of parameters. The particular test activated is controlled by the decoder circuit 25. For example, if the test receiver 10 is tuned to a signal $S_1$ having an A channel component of 500 Hz., the decoder is responsive to close switch $SW_1$ and activate the test circuit comprising filter $F_1$, amplifier $K_1$ and comparator $L_1$. The entire output $E'_n$ is introduced via line 30 into band-reject filter $F_1$, which operates in the well-known manner to filter out or eliminate the "pure" input signal $S_1$, or in our example, 500 Hz., from the signal $E'_1$. Thus, the output of band reject filter $F_1$ is only the audio portion of the noise $N'_1$ and the distortion $D'_1$ of the signal $E'_1$.

The output of the band-reject filter $F_1$ is introduced via closed switch $SW_1$ into amplifier $K_1$, which operates in the known manner to amplify the noise and distortion signals $N'_1$ and $D'_1$ to a predetermined level suitable for performing an efficient and accurate test. The output of the amplifier $K_1$ is next introduced into the limit comparator $L_1$ where it is compared with a reference level voltage corresponding to the signal $E'_1$ which is introduced into the limit comparator $L_1$ via line 28.

The limit comparator $L_1$ compares the relative strength of the output signal $E'_1$ and the noise plus distortion components of this signal $(N'_1+D'_1)$ to determine whether the signal-to-noise ratio is within acceptable parameters. The limit comparator circuitry is a matter of design choice and operates in the well-known manner wherein an energizing signal is produced by the limit comparator circuitry only when the relative quantity of the reference level signal $E'_1$ introduced via line 28 and the output signal of amplifier $K_1$ are such that the performance of the test receiver 10 is unacceptable, i.e., outside preset limits.

The output of the limit comparator circuit $L_1$ is introduced into a limit logic network 26. The limit logic network 26 simply selects the input signal which is activated by the closing of the proper switch $SW_1-SW_n$ by the test signal decoder circuitry 25 and introduces this output into the diagnosis logic 38 which is activated by an output signal received from the level logic network 36. The particular configuration of the limit logic circuit 26 is a matter of design choice and this circuit operates in well-known manner to select an input signal from a plurality of lines only one of which is activated at any one instant.

The test signal decoder 25 produces an output via line 40 which is also introduced into the level logic circuit 36 and display monitor 32. Using our example test signal $S_1$ of 500 Hz., the test signal decoder will respond to this signal to activate the level logic circuit 36, which in turn activates diagnosis circuit 38, to look at the signal being introduced from the limit logic circuit 26 on line 210.

For proper evaluation of the signal produced by the limit logic ciruit 26, the operation of the test signal decoder 25 and the level logic circuit 36 takes on added significance at this point. It has been found that the proper evaluation of a particular receiver requires at least limited testing at the low band ends. For example, in a typical AM receiver, the band ends will be approximately 540 KHz. and 1700 KHz., and one test will be performed at 540 KHz. Testing of a mid-band signal is also desirable. Therefore, assuming that the exemplary signal $S_1$ of 500 Hz. is carried on a carrier signal of 540 KHz., the level logic circuit 36 responds to the carrier signal to indicate to the diagnosis logic 38 that the particular test is being carried out at a band end. Thus, the band end light $D_1$ on the display monitor 32 will be illuminated and if the signal produced by the limit logic circuit is within the parameters prescribed by the limit comparator $L_1$, the pass light 37 will be illuminated on the diagnosis panel 35, indicating that the receiver has passed this particular test.

Upon completion of the test corresponding to signal $S_1$, and assuming the pass light has been illuminated, the system is now ready to proceed to the next test.

For example, assuming that the input signal $S_2$ is in the middle of a particular broadcast band, the test receiver may next be tuned to this signal and as before, this signal will be generated across the various output load resistors $R_{01}-R_{04}$. The output signal across resistor $R_{01}$ is filtered by band-pass filter 14a and is introduced into the band reject filters $F_1-F_n$ and the signal decoder 25 via line 30, as before. The test signal decoder 25 responds to the signal $S_2$ to open switch $SW_1$ and close switch $SW_2$. The testing functions are now activated for signal $S_2$. Of course, the proper lights will be illuminated at the display monitor 32 in response to the output signal produced by the limit logic circuit 26 and the diagnosis logic 38 when activated by the level logic circuit 36. This sequencing of testing will continue, wherein switches $SW_1-SW_n$ are sequentially activated in response to the sequential tuning of the test receiver 10 to signals $S_1-S_n$, respectively.

As stated, switch $SW_3$ activates the only test network in the preferred embodiment which does not respond to and check the A channel signal across resistor $R_{01}$. This particular test checks the receiver for stereophonic separation. In order to do this, a signal $S_3$ comprising only an A channel component is introduced into the receiver 10. As before the presence of this signal across resistor $R_{01}$ and on line 30 activates decoder 25 to close the proper switch, in this case switch $SW_3$. However, the testing circuit activated by switch $SW_3$ receives a signal on line 29 which is the receiver output across B channel resistor $R_{01}$ as modified by the band-pass filter 14b. Since, ideally, there is only an A channel component of signal $S_3$, the presence of the signal across resistor $R_{02}$ is an indication of breakdown of stereophonic separation. This signal is amplified at amplifier $K_3$ and compared with preset limits at comparator $L_3$ to determine if the stereophonic separation of receiver 10 is within acceptable parameters. The output of comparator $L_3$ is conveyed to the diagnosis logic 38 via limit logic 26 in the described manner, whereby lamp $D_3$ is illuminated to indicate the particular test and pass lamp 37 is illuminated if the test is passed.

Of course, use of the method and apparatus of the present invention permits test procedures in addition to those shown in FIG. 2 and corresponding to distortion analyzer 18 of FIG. 1.

The test receiver 10 may be manually tuned to each of the various signals $S_1-S_n$, whereupon the test signal decoder 25 responds to the particular tuned signal to activate the proper testing network. Alternatively, a servomechanism 41 may be coupled to the test signal decoder 25 via line 46, the diagnosis logic 38 via line 47, and the test receiver 10 via line 45. The servomechanism will automatically tune the receiver to one of the signals $S_1-S_n$ whereupon the test signal received by the receiver 10 will be generated on line 30 and the test signal decoder will respond thereto to close the proper switch $SW_1-SW_n$ and activate the corresponding testing procedure. The test signal decoder will also signal to the servomechanism 40 that the tuner has properly tuned the test receiver to one of the test signals, thereby deactivating the servomechanism until the test is complete. Upon completion of the particular test, the diagnosis logic 38 will introduce a signal into the servomechanism 41, activating the servomechanism to tune the test receiver 10 to the next test signal. When the servomechanism 41 is incorporated in the testing procedure of the present invention, the testing procedure becomes fully automated, with no intervention by personnel between the initial step of inserting the test receiver 10 into the testing circuitry and the final step of removing the test receiver 10 from the circuitry upon completion of all testing.

Detailed schematic diagrams of a test signal decoder, a level logic circuit and a diagnosis logic circuit according to the present invention are illustrated in FIGS. 3a, 3b, 3C, and 3d, respectively. The circuits shown are all designed using the standard "Transistor-Transistor Logic" (TTL) with the various functional blocks being identified by the manufacturers' component numbers known and used throughout the industry.

Figure 3A:
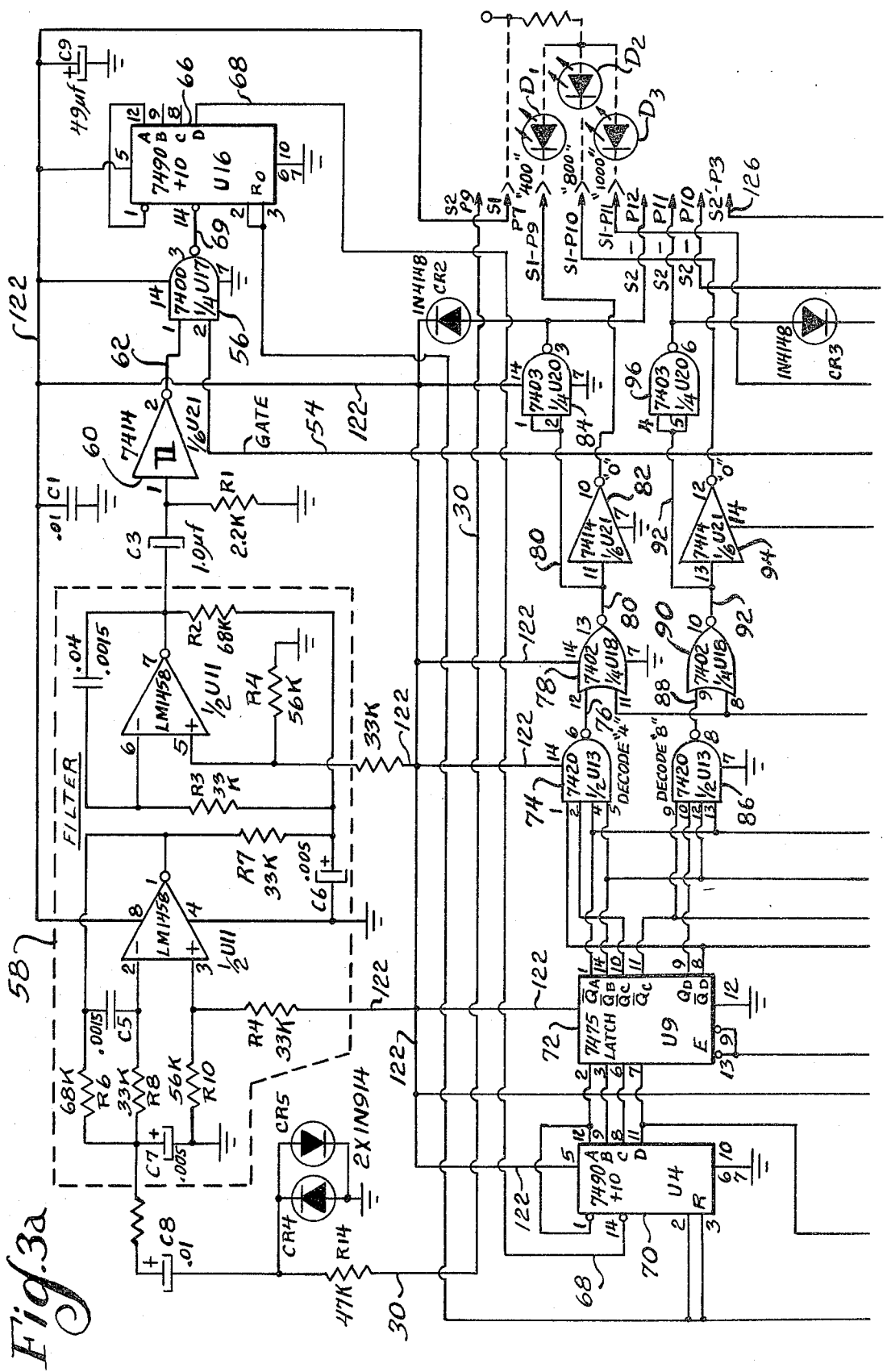
Figure 3B:
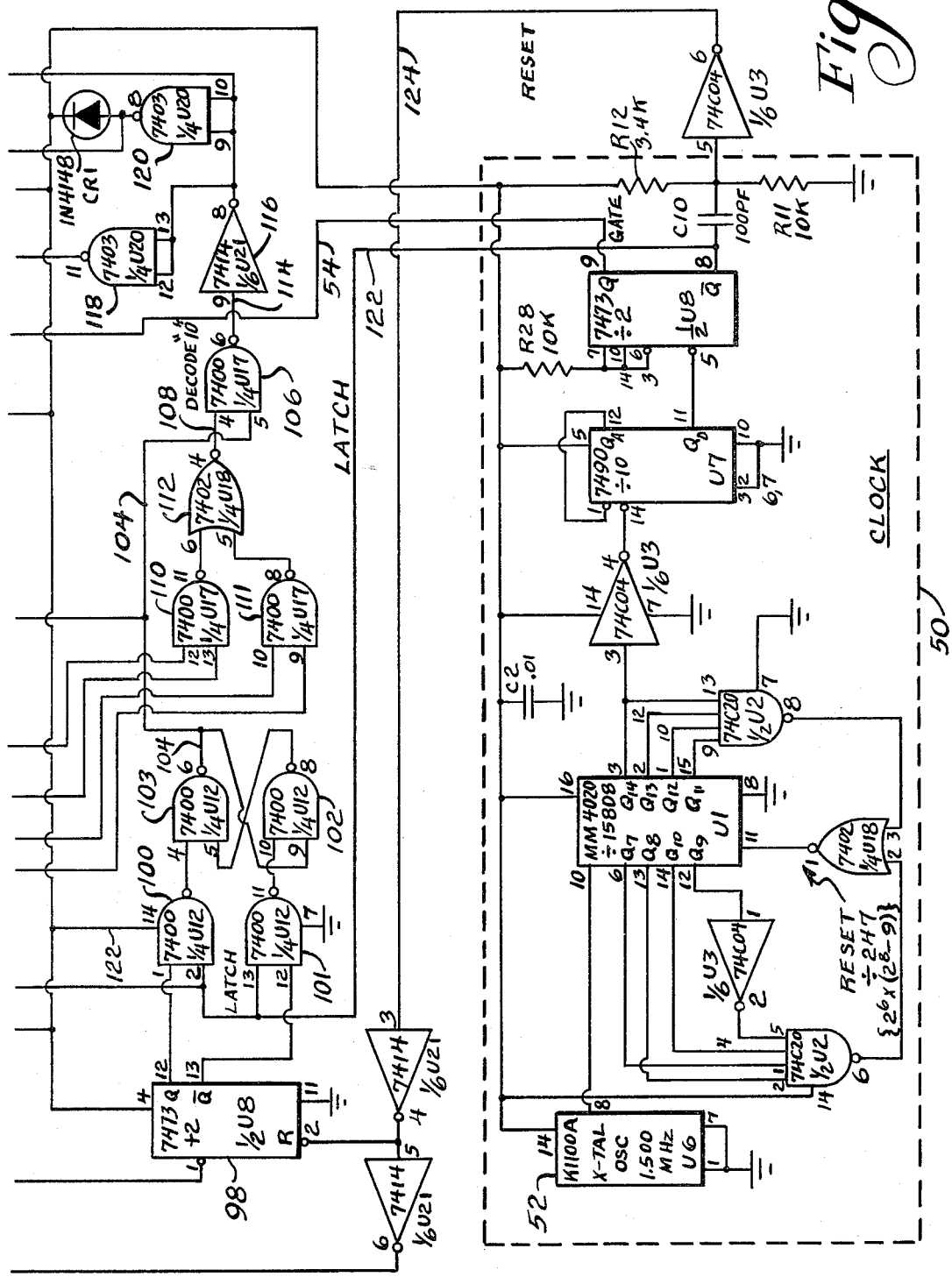

With particular reference to FIGS. 3a and 3b, it will be noted that the heart of the test signal decoder 25 comprises a typical clock 50 driven by a quartz crystal oscillator 52. The clock 50 produces a continuous square-wave output at 54 which provides one input to the gate 56. The second input to the gate 56 is provided by the output generated by the test receiver 10, as presented on line 30, and thus corresponds to the tuned signal $S_n$, which is, of course, analog. The analog signal on line 30 is passed through the active filter network 58 and converted to a corresponding digital signal at convertor 60 to provide the second square-wave or digital input to gate 56 on line 62.

The signal on line 62 corresponds to the tuned signal $S_n$ present on line 30, wherein the frequency of the square-wave pulses defines the frequency of the audio portion of the tuned signal. The clocking signal on line 54 periodically activates gate 56 for producing a sequencing signal on line 64 which corresponds to the frequency of the tuned signal $S_n$. The sequencing signal 64 drives the divider circuit 66 to produce a corresponding coded output signal on line 68 which is acceptable by the counter 70 for driving the sequencing functions. The counter 70 counts the number of pulses present on line 68 to produce an output at its terminals A, B, C and D for identifying the particular signal $S_n$ to which the receiver 10 is tuned. The output of counter 70 is next entered into the latch circuit 72, which in turn, produces a digital code at terminals $\overline{Q}_a - \overline{Q}_d$ and $\overline{Q}_c, Q_d$ corresponding to the frequency of the tuned signal $S_n$ present on line 30. This signal is used for driving the various gates to close the proper switches $SW_1-SW_n$ and illuminate the corresponding lamps on the display monitor 32 for controlling and indicating the particular test being performed.

For example, if the particular signal $S_1$ on line 30 results in a code produced by latch circuit 72 which is defined by the digital number "4", the binary counter 74, which is set to produce an activating signal on line 76 in response to the number "4", will activate the gate 78 to generate a drive signal on line 80. The drive signal 80 drives the driver 82 and illuminates the proper lamp $D_1$ on the test panel 46 of display monitor 32, thereby visually indicating the particular test being performed when the signal $S_1$ is present on line 30. The drive signal 80 also energizes relay control circuitry through gate 84 for closing the proper switch, in this case switch $SW_1$.

When the receiver is tuned to another signal $S_2$, the signal on line 30 will result in a different digital code being produced at the output of latch circuit 72. For example, assuming the signal $S_2$ results in a digital code of "8", the binary counter 86 is responsive to produce a signal on line 88 for activating the gate 90 to generate a drive signal on line 92 for driving driver 94 and illuminating the corresponding lamp $D_2$ on the display monitor 32. Of course, the drive signal 92 also energizes relay control circuitry through gate 96 for closing the corresponding switch, in this case switch $SW_2$.

As will be noted from FIGS. 3a and 3b, the counter 70 and latch circuit 72 count only "0-9". Therefore, any additional testing in our particular example requires additional circuitry for closing the proper switches $SW_1-SW_n$ and illuminating the corresponding lamps $D_1-D_n$ on the display monitor. For example, if the signal $S_3$ on line 30 results in a digital code of "10", an additional counter 98 is required. The counter 70 energizes counter 98 when an output is present on terminal D of counter 70, indicating that the next input pulse received by the counter will indicate a digital code of greater than "9". The counter 98 produces an output at terminals Q and $\overline{Q}$ to indicate how much greater than "9" the count is, or in our example, one greater than "9", or "10". Of course, additional latch circuitry is required and is provided by the combined gates 100, 101, 102, and 103. The output signal on line 104 is produced by latch circuit gate 103 and provides the first input to the binary counter 106. The second input to the binary counter 106 is generated on line 108 by the output of latch circuit 72 which drives gates 110, 111, and 112 to indicate that the digital number code is greater than "9" or, in our example, "10". The binary counter 106 is activated by the code "10" to produce a signal on line 114 for driving driver 116 and illuminating the corresponding lamp $D_3$ on the display monitor 32 via gate 118. The driver 116 also activates corresponding relay circuitry through gate 120 for closing the proper switch, in this case switch $SW_3$.

Of course, additional like circuitry may be employed to provide proper sequencing for as many signals $S_1-S_n$ and as many testing procedures as are required for the particular receiver 10 being tested.

It will be noted that the various counters, latch circuits and other active components are synchronized with the operation of gate 56 by means of a clocking signal generated by the clock 50 and carried on line 122. The clock reset signal is present on line 124.

Figure 3C:
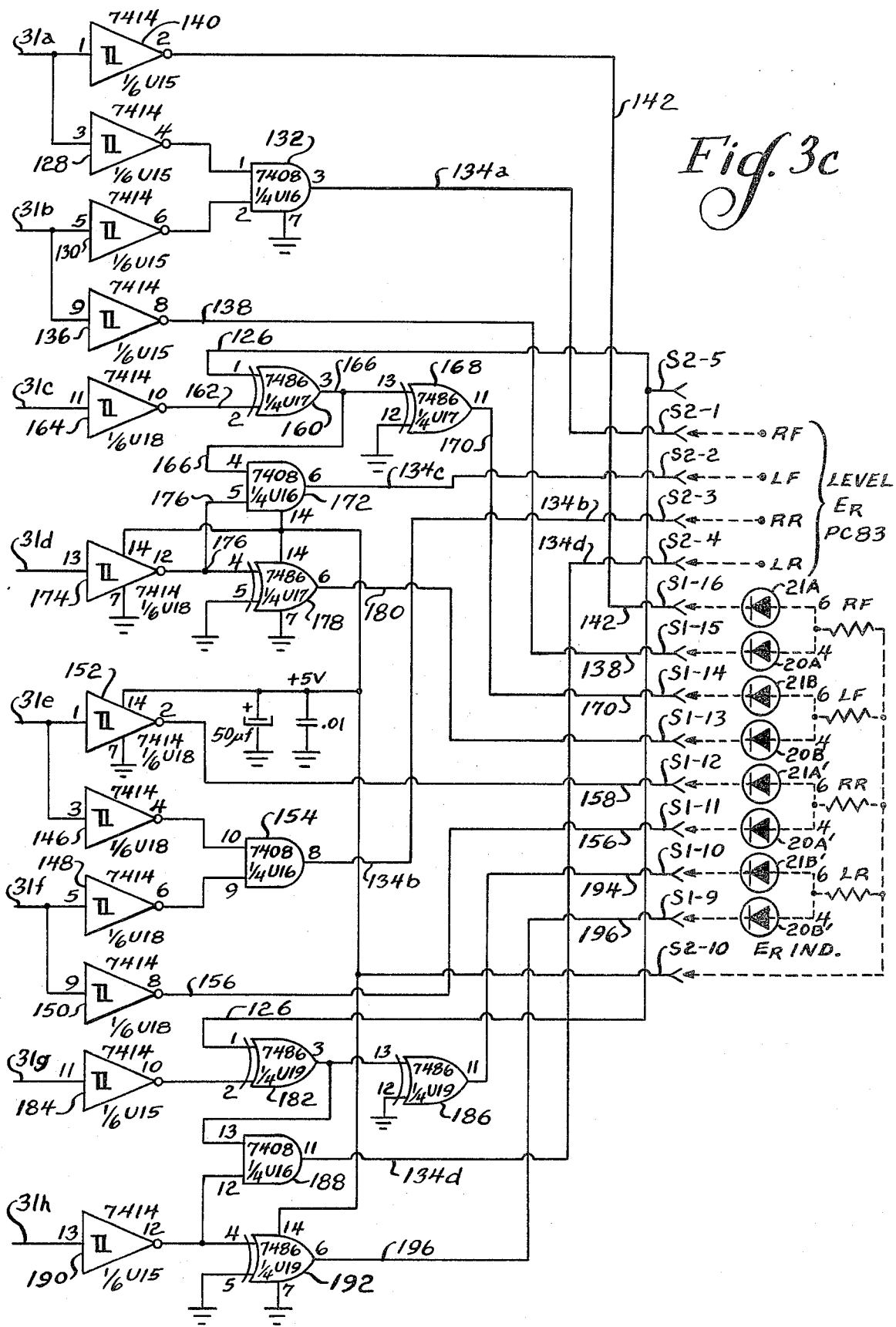

A detailed schematic diagram of the level logic circuitry 36 is illustrated in FIG. 3c, wherein the output of the level comparators 24a-24d, depicted generally on line 31 in FIGS. 2a and 2b, is introduced into the level logic circuit at lines 31a-31h in FIG. 3c. Each of the level comparators 24a-24d produces a pair of outputs for each signal $S_1-S_n$ tested at the load resistors $R_{01}-R_{04}$.

For example, the level comparator 24a will compare the tuned signal $S_n$ present across resistor $R_{01}$ with both a high reference limit and a low reference limit signal. To be acceptable, the signal $S_n$ must be between these two references. The output of level comparator 24a is generated on lines 31a and 31b. If the signal $S_n$ is within the preset limits, the signals on both lines 31a and 31b remain "low". When the signals on 31a and 31b are "low", each of the driver/invertors 128 and 130 produces a "high" output which is introduced into gate 132. The presence of two "high" signals at gate 132 energizes the gate to generate an activating signal component on line 134a. The activating signal component 134a is one of the necessary components of the signal on line 134 (see FIG. 2b) required to energize the diagnosis logic 38, as will be explained.

Assuming that the signal $S_n$ across resistor $R_{01}$ is not acceptable, but is too high, then the signal on line 31b is "high" and the output of driver/invertor 130 is "low" inhibiting the activating signal component 134a. Driver/invertor circuit 136 is responsive to the high signal on line 31b to produce an output on line 138 which is operative to illuminate the lamp 20A on balance panel 34 of the display monitor, indicating that the channel A front speaker signal across resistor $R_{01}$ is too high and that the receiver is out of balance.

Conversely, if the signal across the resistor $R_{01}$ is too low, the signal on line 31b remains "low" but the signal on line 31a is "high", again inhibiting the activating signal component 134a. Driver/invertor 140 is responsive to the high signal on line 31a to produce an output on line 142 which illuminates the lamp 21A on balance panel 34 of the display monitor, indicating that the channel A front speaker signal across resistor $R_{01}$ is too low and, again, that the receiver is out of balance.

The output of level comparator 24c is introduced into the level logic circuitry on lines 31e and 31f for measuring the channel A rear speaker signal across resistor $R_{03}$, with driver/invertors 146, 148, 150 and 152 corresponding to driver/invertors 128, 130, 136 and 140 respectively, and with gate 154 corresponding to gate 132. An acceptable signal across resistor $R_{03}$ produces a component of the activating signal on line 134b for energizing the diagnosis logic 38. A high signal across resistor $R_{03}$ inhibits the activating signal component 134b and generates an output on line 156 which is operative to illuminate lamp 20A' on the balance panel 34 for indicating that the channel A rear speaker signal across resistor $R_{03}$ is too high. Conversely, a low signal across resistor $R_{03}$ generates an output on line 158 which is operative to illuminate lamp 21A' for indicating that the channel A rear speaker signal across resistor $R_{03}$ is too low.

The output of level comparator 24b is introduced into the level logic circuitry on lines 31c and 31d and measures the signal across the channel B front speaker resistor $R_{02}$. Again, if the signal is acceptable, the signals 31c and 31d are both low. This of course, produces a component of the activating signal 134 on line 134c. However, additional logic is required for the channel B analysis since the signal $S_n$ for channel B is not always present, particularly during stereophonic separation testing with signal $S_3$, as above described. Since the activating signal component 134c must be present in order to energize the diagnosis logic 38, this signal must be generated even when the lack of a signal $S_n$ across resistor $R_{02}$ gives a false low reading.

Thus, the level logic circuitry for channel B front speaker resistor $R_{02}$ must be responsive to two distinct conditions. First, the circuit must respond to the usual condition where a signal $S_n$ does exist across resistor $R_{02}$ and must analyze this signal for acceptability. Second, the circuit must respond to the special condition where no channel B signal component exists and in this event the circuit must respond to inhibit the illumination of the lamps on the balance panel 34 of the display monitor 32, while simultaneously generating the corresponding activating signal component 134c for energizing the diagnosis logic 38.

It will be noted that a signal is generated on line 126 (see FIGS. 3a and 3b) whenever signal $S_3$ is tuned. As stated, the channel B component of the signal $S_3$ is zero. Thus, the signal on line 126 is used for overriding the false low signal caused by the zero component and for generating an activating signal component 134c while simultaneously inhibiting the illumination of lamps 21B and 21B' on the balance panel 34. In operation, the signal on line 126 is introduced as one input to gate 160. The second input to gate 160 is the output on line 162 of the driver/invertor circuit 164 which responds to the signal present on line 31c from the level comparator 24b.

Assuming that the channel B component of the signal $S_n$ is present and is acceptable, the signal on each of lines 31c and 31d is "low". Since a channel B component of the signal $S_n$ is present, the signal on line 126 is also low. The gate 160 responds to this condition to generate an output on line 166, wherein gate 168 produces an output which indicates that the signal is acceptable and therefore lamp 21B on the balance panel 34 is not illuminated.

The signal on line 166 is also introduced into the gate 172. Since the signal on line 31d is also "low", the driver/invertor circuit 174 produces an output on line 176 which is introduced into gate 172 for producing the activating signal component on line 134c. As before, if the signal on line 31c is "high", the output on line 166 of gate 160 generates an output through gate 168 on line 170 to illuminate the lamp 21B on the balance panel 34 for indicating that the signal across the channel B front speaker resistor $R_{02}$ is too low. Conversely, if the signal on line 31d is high, gate 178 is activated to produce a signal on line 180 for illuminating the lamp 20B, thus indicating that the signal across the channel B front speaker resistor $R_{02}$ is too high. When either of these conditions exist, the input signals on lines 162 and 176 to gate 172 are not in parity, and the signal on line 134c is inhibited. Of course, when the signals on lines 31c and 31d are both "low", indicating an acceptable signal across resistor $R_{02}$, the signals on lines 166 and 176 are in parity and gate 172 is activated for generating the activating signal component 134c.

During the special condition when no B component is present in signal $S_n$, the signal on line 31c remains "low". However, the signal on line 31d indicates a false low reading across resistor $R_{02}$ and without further logic, this would result in the inhibition of the signal on line 134c while activating the circuitry for illuminating lamp 21B. However, a "high" signal is now present on line 126 and is introduced into gate 160, and this overrides the condition caused by the low signal across the resistor $R_{02}$, whereby gate 168 remains deenergized and gate 172 is energized for inhibiting the siginal on line 170 and generating the signal on line 134c.

Since level comparator 24d measures the signal across the channel B rear speaker resistor $R_{04}$, circuitry identical to that coupled to level comparator 24b is required. The output level comparator 24d is introduced into the level logic circuitry on lines 31g and 31h, wherein driver/invertors 184 and 190 correspond to driver/invertors 164 and 174, respectively, gate 182 corresponds to gate 160, gates 186 and 192 correspond to the gates 168 and 178, respectively, and gate 188 corresponds to gate 172. Again, the override signal 126 is utilized to override the false low signal across resistor $R_{04}$ whenever a channel B component of signal $S_n$ is not present. Gate 188 operates in the same manner as gate 172 to produce an activating signal component on line 134d. Gate 186 is operative to generate a signal on line 194 for illuminating the channel B rear speaker lamp 21B' whenever the signal across the resistor $R_{04}$ is present, but is too low. Gate 192 operates in the same manner as gate 178 to produce a signal on line 196 for illuminating the lamp 20B' whenever the signal across the resistor $R_{04}$ is too high.

A schematic diagram of the diagnosis logic 38 is illustrated in FIG. 3d. This circuitry is activated whenever all four of the activating signal components 134a–134d are present on line 134 (FIG. 2b). As explained, the activating signal components are generated by the level logic circuitry whenever all four output load resistors $R_{01}$–$R_{04}$ indicate an acceptable level of output from receiver 10.

The activating signal components 134a and 134c are introduced into gate 200, whereas the components on lines 134b and 134d are introduced into gate 202. Assuming both components 134a and 134c are energized, gate 200 is activated to generate an energizing "high" signal to gate 204 via line 206. If both components 134b and 134d are energized, gate 202 likewise responds to generate an energizing "high" signal on line 208.

The third input signal on line 210 to gate 204 is the output signal from the limit logic circuit 26 (see FIG. 2b). As stated, the limit logic circuit 26 produces a single output signal indicating whether the particular test being performed is passed or failed by the receiver 10. If the test is passed, a "high" energizing signal is present on line 210. Conversely, if the test is failed, a "low" signal is present on line 210. A "low" signal activates gate 212 to energize the test limit fault lamp $Q_1$ on diagnosis panel 35 of display monitor 32.

If one of the front speaker signals is beyond acceptable limits, one of the signal components 134a or 134c will not be energized and gate 200 will produce a "low" signal on line 206. This activates gate 214 and illuminates lamp $Q_2$ on the diagnosis panel 35, indicating malfunction in the front speaker response of the receiver 10. Likewise, if one of signal components 134b or 134d is not energized, gate 202 produces a "low" signal on line 208 which energizes invertor 214 and driver 216 to illuminate lamp $Q_3$, indicating malfunction in the rear speaker response of the receiver 10.

A fourth input signal is provided to gate 204 via line 218. This signal comes from the series of invertors 220, 221, which are driven by the output signal of a voltage comparator 222. The voltage comparator monitors the power level input to receiver 10 for determining if the receiver is being powered by an acceptable source, since this is one common cause of malfunction which is not caused by faulty receiver components.

The specific design of the voltage comparator is a matter of choice, the comparator of the preferred embodiment producing a "high" energizing signal on line 224 if the receiver driving power is within 13.5–15.0 volts. A "high" signal on line 224 produces a "high" signal on line 218, whereas a "low" signal on line 224 produces a "low" signal on line 218 which, in turn, drives the invertor/drivers 226, 228 to illuminate lamp $Q_4$, indicating a voltage level malfunction on diagnosis panel 35.

Assuming all input lines 206, 208, 210 and 216 to gate 204 carry "high" signals, the gate is energized to produce a "low" signal on line 230. This signal illuminates pass lamp 37 on the diagnosis panel 35, indicating that the receiver has passed the particular tests then being performed.

The voltage comparator 222 comprises a pair of comparing circuits 232 and 234, wherein the comparing circuit 232 receives a first input signal on line 236 which corresponds to the high limit of acceptable power or, in our example, 15.0 volts. The circuit 234 receives a first input signal on line 238 which corresponds to the low limit or 13.5 volts. The second input signal to each circuit is presented on line 240 and corresponds to the actual operating voltage driving the receiver 10. As long as the signal on line 240 represents a driving voltage of between 13.5 volts and 15.0 volts, the signal on line 224 is "high". A driving signal of above 15.0 volts generates a "low" signal at circuit 232. A driving signal of below 13.5 volts generates a "low" signal at circuit 234. In either event, the signal on line 224 is "low" and lamp $Q_4$ is illuminated.

The transistor T5 and associated circuitry provide the power circuitry for driving the electronic components.

ACHIEVEMENT

The present invention provides the means for and method of effectively and efficiently testing the response and quality of the output produced by radio receivers and the like without the aid of skilled technicians or trained personnel. The tests are each individually set up with dedicated circuit components, wherein a particular test is performed in response to the receiver being tuned to a particular test signal. Defective units are identified for further attention and defects are diagnosed and noted.

This invention provides sequencing means for automatically determining the particular signal to which the receiver is tuned and for activating the proper testing procedure in response to this signal.

The present invention also provides the means for and method of accumulating and evaluating the test data at a logic center and diagnosis center, wherein the response of the receiver being tested is completed without requiring any interpretation by skilled personnel.

While the functions of the sequencing, accumulating and evaluating circuits are of critical significance, the particular design of each is a matter of choice. The disclosed means and methods are intended to encompass any alternatives or equivalents which incorporate the scope and spirit of the invention as defined by the appended claims.

What is claimed is:

1. An automated system for conducting a plurality of performance tests on a radio receiver for determining the full response characteristics of the receiver, the system being of the type including means for producing a plurality of predetermined simulated broadcast signals, means for introducing the simulated signals into the receiver, said receiver producing an output signal responsive to each one of said simulated broadcast signals, means connected to said receiver for detecting each said output signal, and means connected to said receiver for analyzing the quality of each said output signal, the improvement comprising:
   a. a plurality of said analyzing means in parallel, each of said analyzing means comprising means for comparing a particular one of each said receiver output signals with respect to a specific set of preset parameters for conducting one of said plurality of performance tests;
   b. means for selecting and activating a specific one of said analyzing means in response to the particular output signal produced by the receiver, and
   c. one of said simulated broadcast signals including a plurality of separate and distinct components, said receiver being responsive to said broadcast signals to produce an output signal comprising a like plurality of separate and distinct components, said analyzing means including means for comparing the relative strengths of the respective components of the output signal.

2. The apparatus of claim 1, wherein the receiver is selectively tunable to any one of said plurality of simulated broadcast signals, and wherein said selecting means is responsive to the particular tuned signal for selecting and activating a specific one of said parallel analyzing means.

3. The apparatus of claim 2, including means for automatically tuning the receiver to respond to a selected one of the simulated signals.

4. The apparatus of claim 2, each of said parallel analyzing means producing a pass signal or a fail signal for indicating the quality of the performance of the receiver in response to a specific one of said simulated broadcast signals, said system including means for identifying the pass or fail signal with the particular simulated signal to which the receiver is tuned and for identifying the particular test conducted of the plurality of tests.

5. The apparatus of claim 1, wherein said analyzing means includes:
   a. means for filtering out everything but the impurities of the output signal produced by the receiver; and
   b. means for comparing said impurities with a predetermined set of parameters.

6. The apparatus of claim 5, wherein said analyzing means includes means for filtering out uncritical portions of the said impurities prior to said comparing means.

7. The apparatus of claim 6, wherein the critical portion of said output signal is an audio signal discernible by the human ear.

8. The apparatus of claim 1, wherein said analyzing means comprises means for comparing the strength of the receiver output with respect to the strength of the particular one of said simulated signals.

9. The apparatus of claim 1, wherein the receiver is responsive to a simulated broadcast signal containing a stereophonic, two channel signal, for producing a corresponding output signal having two distinct components, the analyzing means including means for determining the balance between the two components of the output signal.

10. The apparatus of claim 1, wherein the receiver is responsive to a simulated monophonic broadcast signal to produce an output signal comprising the complete monophonic signal on each of a plurality of channels, the analyzing means including means for comparing the level and quality of the signal present on each of the plurality of channels relative to one another.

11. The apparatus of claim 1, wherein the receiver is responsive to broadcast signals on a plurality of broadcast bands, the analyzing means including means for testing the bandwidth response of the receiver for each of the plurality of bands.

12. The apparatus of claim 1, including power means for driving the receiver, the analyzing means including means for comparing the relative strengths of the simulated broadcast signal and the output signal relative to the level of the power signal.

13. An automated system for conducting a plurality of performance tests on a tunable radio receiver for comparing the response characteristics of the receiver to preset standards, the system being of the type including a plurality of signal generators for simultaneously introducing a plurality of simulated broadcast signals into the receiver, said receiver being selectively tuned to one of said simulated signals for producing a corresponding analog output signal, and means for analyzing the quality of the output signal relative to the tuned one of said plurality of simulated broadcast signals, the improvement comprising:
   a. a plurality of analyzing means in parallel, each of the analyzing means comprising means for comparing the receiver output with a specific set of preset parameters, for conducting one of the plurality of tests, said analyzing means including
      i. a band-pass filter for filtering out uncritical portions of the output signal produced by the receiver;
      ii. a band-reject filter in tandem with the band-pass filter for filtering out all but the impurities of the output signal produced by the receiver; and
      iii. a comparator responsive to both the filtered and unfiltered output signals produced by the receiver for determining if the relative strengths of the filtered and unfiltered signals are within preset parameters; and
   b. means responsive to the particular tuned simulated broadcast signal for selecting and activating a specific one of said parallel analyzing means.

14. The apparatus of claim 13, including means for automatically tuning the receiver to one of the plurality of simulated broadcast signals.

15. The apparatus of claim 13, wherein the selecting means is responsive to the tuned simulated broadcast signal to produce a digital sequencing signal for selecting a specific one of said analyzing means, the selecting means including means for converting the tuned simulated broadcast signal to a corresponding digital signal.

16. The apparatus of claim 15, the analyzing means including means responsive to the corresponding digital signal for producing a first signal for indicating the particular one of the plurality of tests performed and a second signal for indicating whether the receiver performed within the preset parameters for the particular test.

17. The apparatus of claim 13, the band-pass filter filtering out any portion of the output signal produced by the receiver which is less than 30 Hz. and greater than 18,000 Hz. in frequency.

18. The apparatus of claim 13, wherein the receiver is responsive to a simulated broadcast signal containing a stereophonic, two channel signal comprising separate and distinct components on each of said signals for producing a corresponding two channel output signal, the analyzing means including means for determining the balance between the two components of the output signal.

19. The apparatus of claim 18, wherein said balance determining means includes means for selectively ignoring one of the components of the output signal in response to a stereophonic, two channel signal having a signal component on one channel only of the two channels.

20. A method of automatically and sequentially conducting a plurality of performance tests on a tunable radio receiver for comparing the performance characteristics of the receiver with a set of predetermined parameters, the method including the steps of:
   a. providing means for producing a plurality of predetermined simulated broadcast signals;
   b. simultaneously introducing the plurality of simulated broadcast signals into the receiver;
   c. sequentially tuning the receiver to each one of said plurality of signals;
   d. producing a distinct receiver output signal in response to each of the signals to which the receiver is sequentially tuned;
   e. selecting and conducting a particular one of said plurality of performance tests in response to the signal to which the receiver is tuned to thereby determine the quality of the corresponding output signal produced in step (d);

f. activating the tuning step (c) upon completion of the test selecting and conducting step (e); and g. inhibiting the tuning step (c) during step (e).

21. The method of claim 20, wherein the receiver is tuned to a simulated broadcast signal comprising a stereophonic signal having two separate and distinct signal components, and wherein the output signal of step (d) is a corresponding signal having two separate and distinct signal components, step (e) including measuring the relative strengths of the two signal components against a set of predetermined parameters.

22. The method of claim 20, wherein step (f), when activated, is operative to tune the receiver to the next simulated signal in sequence.

23. The method of claim 20, comprising the step of deleting uncritical portions of the output signal produced in step (d), prior to step (e).

24. The method of claim 23, which includes the step of deleting all but the audio portions of the output signal prior to step (e).

25. The method of claim 20, wherein step (e) includes:
  i. deleting all but the impurities from the output signal of step (d); and
  ii. comparing the impurities with a predetermined set of parameters.

* * * * *

UNITED STATES PATENT AND TRADEMARK OFFICE
CERTIFICATE OF CORRECTION

PATENT NO. : 4,245,352
DATED : January 13, 1981
INVENTOR(S) : Oleh Karpowycz and Narendra C. Thakkar It is certified that error appears in the above-identified patent and that said Letters Patent are hereby corrected as shown below:

Col. 1, l. 29   "STD185-175" should be --STD185-1975--
Col. 1, l. 38   "AM/PM" should be --AM/FM--
Col. 3, l. 29   after "'pure'" insert --signal--
Col. 4, l. 50   "resistor $R_i$ a composite" should be --resistor $R_i$ a composite--
Col. 4, l. 59   "mean" should be --means--
Col. 5, l. 60   "$R_{01}-R_{04}$" should be --$R_{01} - R_{04}$--
Col. 6, l. 14   "24a1424d" should be --24a-24d--
Col. 7, l. 65   before "signal" insert --test--
Col. 8, l. 22   before "signal", second occurrence, delete "the" and insert --any--
Col. 8, l. 66   "3C" should be --3c--

Signed and Sealed this

Twelfth Day of May 1981

[SEAL]

Attest:

RENE D. TEGTMEYER

Attesting Officer

Acting Commissioner of Patents and Trademarks